United States Patent [19]
Bowman et al.

[11] Patent Number: 5,226,958
[45] Date of Patent: Jul. 13, 1993

[54] SEALANT FOR PNEUMATIC INNER TUBES AND TUBELESS TIRES

[75] Inventors: Ronald R. Bowman; Brian C. Bowman, both of Boulder, Colo.

[73] Assignee: Pacemark, Inc., Boulder, Colo.

[21] Appl. No.: 683,463

[22] Filed: Apr. 11, 1991

[51] Int. Cl.$^5$ ............................................. C09K 3/12
[52] U.S. Cl. ...................... 106/33; 106/189; 106/197.2; 106/204; 106/287.1; 106/287.26
[58] Field of Search ............ 106/33, 189, 197.2, 106/204, 287.1, 287.26; 523/166

[56] References Cited

U.S. PATENT DOCUMENTS

| | | | |
|---|---|---|---|
| 2,315,555 | 4/1943 | Skeen | 106/33 |
| 3,352,696 | 11/1967 | Wallace | 106/33 |
| 4,713,114 | 12/1987 | Smith | 106/33 |
| 4,776,888 | 10/1988 | Morrow | 106/33 |

FOREIGN PATENT DOCUMENTS

| | | | |
|---|---|---|---|
| 0045185 | 2/1982 | European Pat. Off. | 106/33 |
| 0281252 | 9/1988 | European Pat. Off. | 106/208 |

*Primary Examiner*—David Brunsman
*Attorney, Agent, or Firm*—Sheridan Ross & McIntosh

[57] ABSTRACT

The present invention provides mobile sealant compositions that are particularly useful for bicycle tire tubes and the like. The improvements include a novel particulate for use in the sealant composition that is greatly conformable for closing pores in a plug. Another improvement includes a balanced fiber composition as part of the sealant. Also, the carrier fluid is formulated to substantially reduce losses due to gaseous diffusion by preferably utilizing high levels of ethylene glycol, such as greater than about 60 percent.

48 Claims, No Drawings

SEALANT FOR PNEUMATIC INNER TUBES AND TUBELESS TIRES

FIELD OF THE INVENTION

The present invention relates to sealant materials useful for sealing pneumatic tires that are tubeless or that utilize inner tubes. In particular, the present invention relates to a mobile sealant that includes fibrous and particulate matter in a carrier fluid.

BACKGROUND OF THE INVENTION

Pneumatic tire assemblies can be classified generally as either tube-type, in which a casing confines an inner tube filled with pressurized air, or tubeless, in which a lined casing is sealed to a metal wheel rim with the casing and rim defining the space filled with pressurized air. Tube-type tires are most commonly used for smaller wheels such as motorcycle wheels and bicycle wheels. Tubeless-type tires are most commonly used for automobiles and other larger vehicles.

Several types of sealants for pneumatic inner tubes and tubeless tires are known. The sealants can be generally separated into three categories. The first category includes sealants that form an essentially immobile layer on the inside of the tube or tire. This type of sealant is soft enough in consistency to seal around a puncturing object or flow into a hole left by a puncturing object. However, this type of sealant is not well suited for inner tubes, primarily due to the difficulty in applying the immobile layer of sealant to the inside of an inner tube. This type of sealant is also adhesive in nature, and causes the walls of a deflated inner tube to stick together, unless the surfaces are treated or covered to prevent this.

A second type of sealant includes materials that gel or dry out soon after entering or covering a puncture. This type of sealant is typically placed in a tire or tube after the tire or tube has been punctured. This type of sealant has a short lifetime and is therefore not applicable for permanent additions to tires or tubes. This type of sealant can also cause adhesion between the inside surfaces of a deflated inner tube, as discussed above. Further, there is a substantial likelihood that this type of sealant will permanently clog the air valve of the tube or tire, particularly in bicycle tires that are frequently desired to adjust the pressure for various riding conditions.

A third type of sealant may be characterized as a "mobile" sealant. Typically, this type of sealant includes fibrous and particulate matter in a carrier fluid. The carrier fluid should not substantially dry, gel, or otherwise change in consistency for long periods of time and the fluids are meant to last for years within the tube. The sealant should be mobile enough to slump to the bottom of the tire when the tire is not rapidly revolving, and mobile enough to distribute evenly around the outer portion of the inside of the tube or tire due to centrifugal forces when the tire revolves rapidly. When the tire is punctured and pressure forces the sealant through a hole that is not too large, the fibers and particulates are swept into the puncture and compact there to form a plug that prevents air loss.

As an alternative, many bicyclists who use some form of flat protection choose either thorn-proof tubes or tire liners. Thorn-proof tubes prevent flats simply by their thickness and often thorn-proof tubes are 4 millimeters or more thick. Therefore, many puncturing objects will not penetrate through both the tire and the tube. However, thorn-proof tubes do not prevent punctures from objects longer than about 6 millimeters and they are also very heavy. It is believed that the majority of cyclists prefer not to use them for these reasons. In addition, the thorn-proof tubes have much greater stiffness which compromises the riding quality of wheels containing them.

Tire liners are tough plastic strips that are placed around the inside of the tire between the tube and the tread area of the tire. Tire liners provide protection from some tire penetrations by way of their toughness, but the main protection from typical tire liners is simply due to the extra thickness they provide. Because tire liners are typically less than 2 millimeters thick at their thickest point, they have a much lower weight penalty than thorn-proof tubes. However, they provide substantially less protection than thorn-proof tubes. Tire liners are also stiff enough to have a detrimental effect on the riding quality of the wheel.

The mobile sealants described above provide a number of advantages over the other types of sealant and the thorn-proof tubes or tire liners. Mobile sealants are believed to be most suitable for use in tubes since they are easily emplaced, and do not cause the inside surfaces of the tube to stick together or, when some sealant escapes through a puncture, cause the tube to adhere to the tire. Also, this type of sealant, insofar as it does not harden, does not have a tendency to permanently clog the air valve. Further, the mobility of this type of sealant has important advantages for sealing particular types of punctures. For example, punctures that occur on the sides of the tube or tire require a sealant mobile enough to reach those areas.

While this type of sealant appears to provide a number of advantages, it is believed that it is currently used by only a small percentage of tire consumers. The present inventors believe that this is because existing sealants of this type are far from satisfactory with regard to small tubes, and bicycle tubes in particular.

One of the problems associated with the sealants of this type is that they are often too viscous to adequately spread around the inside of the tube. Given typical sealant amounts used, the full tread extent of the tire will be protected by the sealant only if the sealant is sufficiently mobile to flow easily around the inside of the tube during normal use. In this regard, the viscosity of the sealant relative to the mass of the sealant is critical. For a given viscosity, a larger mass will be more mobile. The viscosity of a mobile sealant is strongly related to the concentration and composition of fibrous and particulate material contained in the carrier fluid. It is relatively easy to make the mobile sealant less viscous by using a lower concentration of these components. However, merely reducing the concentration of fibers or particulates to achieve sufficient viscosity will greatly reduce the overall effectiveness of the sealant, particularly with respect to use for bicycle tires.

Bicycle tires present problems not associated with tubeless car tires, tubeless car tires being much easier to seal than tubes. One reason is that the rubber in the various layers of the tubeless tire is not under a high level of tension, as is rubber in an inner tube. As a result, a puncture hole in a tubeless tire does not tend to "spring open" as it commonly will in a tube. Also, the thickness of a tubeless tire is much greater than the thickness of a tube.

Bicycle tubes are particularly difficult to seal for a number of reasons. Bicycle tubes are relatively thin and require high inflation pressures, a situation demanding a sealant having outstanding sealing capability. Further, the tire tread area is not completely covered by the volume of sealant typically utilized, due to the round cross-section of bicycle tires. The sealant must also seal very quickly and thoroughly because of the low air volume in bicycle tires, and with very little loss of sealant because of the small mass used. The plug must also bleed very little carrier fluid since a low volume of carrier fluid is emplaced in the tube. These special difficulties are compounded by the need for low viscosity in the sealant due to the small mass of the sealant emplaced.

While both the fibrous and particulate matter in the sealant are involved in initiating and forming the plug in the puncture hole, it is believed that the main role of the particulate matter is to close the spaces between the fibers in the plug. That is, without the particulate matter, the plug would be much more porous. If the pores in the plug are not sufficiently closed off, the plug will bleed excessively. Properly formulated mixes should bleed very little, but it is believed that most presently available commercial mixes bleed too much to be suitable for use in bicycle tubes or other small tires or tubes. Those that do not bleed at a significant rate have carrier fluids that are too viscous to be optimum for bicycle tire use. Finally, a substantial fraction of the fluid carrier mass in bicycle tubes is commonly lost by way of gaseous diffusion through the thin inner tube.

The primary problem in formulating a mobile sealant is that improving one characteristic of the sealant will often worsen other characteristics. For example, improving the mobility of given sealant by using a less viscous carrier fluid will increase the tendency of the fluid to bleed. If the mobility of the sealant is improved by reducing the amount of fibers or particulate matter, the ability of the sealant to plug large holes can be substantially reduced. The present invention overcomes these problems by providing a long-lasting and highly mobile sealant that has an outstanding ability to plug puncture holes and exhibits a very low bleeding rate.

SUMMARY OF THE INVENTION

In accordance with the present invention, a composition for sealing a tubeless tire or tube is provided. The composition includes a desired mixture of a carrier fluid and a sealant. The carrier fluid carries and suspends fibrous and/or particulate matter of the sealant. The fibrous or particulate matter when compacted into a hole can be defined as a "plug" for closing the hole in the tubeless tire or tube. The plug typically has a number of pores formed among the fibrous or particulate matter. Preferably, the composition substantially reduces diffusion of the carrier fluid through the tubeless tire or tube; the sealant includes a material that is greatly conformable into the pores and around the fibrous or particulate matter of the plug by means of a pressure gradient occurring in the plug; and the sealant is made of a material that remains substantially suspended in the carrier fluid and does not settle therefrom. It should be understood, however, that the composition could include only one or two of the foregoing aspects. In a preferred embodiment, the carrier fluid includes greater than about 60 percent by volume of ethylene glycol to substantially reduce diffusion. In a more preferred embodiment, the carrier fluid includes greater than about 80 percent by volume ethylene glycol.

With respect to the composition that includes sealant material that is sufficiently soft to be greatly conformable by a pressure gradient occurring in a plug, the sealant, in one embodiment, includes particles that increase in size when combined with the carrier fluid. The particles typically at least double in size and are used to close pores that are formed among the fibers. In another embodiment, the sealant includes droplets that have a substantially greater viscosity than the carrier fluid for closing the pores in the plug.

In connection with the composition that has a sealant material that remains substantially suspended in the carrier fluid, in one embodiment, the sealant material includes a first sealing material and a second sealing material. The second sealing material has a different density than that of the first sealing material. The average density of these two sealing materials substantially corresponds to or is slightly greater than the density of the carrier fluid. In another embodiment, the sealant includes fibers and/or particles that have substantially the same density as the carrier fluid.

Additional advantages of the present invention are readily apparent from the following discussion, particularly when taken together with the accompanying drawing figures.

DETAILED DESCRIPTIONS

The present invention is directed to mobile sealant compositions that provide improved sealing capabilities. The improvements include a novel formulation for a carrier fluid, a novel type of particulate for use within a carrier fluid, and a novel blend of fibrous material that prevents harmful separation of the carrier fluid and the solid matter.

An increased solids content in a mobile sealant will usually enable the sealant to plug holes more sufficiently. However, a higher solids content will generally lead to a more viscous sealant that is less mobile and less able to reach the site of the puncture. Formulating a very mobile sealant that plugs well and bleeds little is very difficult.

According to the present invention, a finely divided material can be used that is of such high softness and high deformability that it easily conforms against or around any substantially firmer sealant solids and into the spaces that would otherwise exist between such relatively non-deformable solids. The forces deforming these particles occur both dynamically during the formation of the plug and also more-or-less statically after the plug formation. In the preferred embodiment this material is made from a powdered substance that absorbs substantial quantities of the carrier fluid to become very soft without either substantially dissolving in the carrier fluid or losing substantial coherency so that the swollen particles do not disintegrate too much during the life of the sealant. Dissolution or excessive dividing of the particles could cause undesired increases in the viscosity of the sealant, or even gelling. Though the discussion will emphasize powdered substances that become highly deformable by way of swelling in the carrier fluid, any other method for incorporating such particles in the sealant are considered to be within the scope of the present invention. One such other method might involve using a non-divided substance that is initially of the needed softness and finely dividing it either before or after placing it in the sealant mix.

Preferably, the particles utilized in the present invention swell to a volume of at least about 2 times the original volume of the particle and more preferably at least 5 or more times the original volume.

An example of a material useful for this purpose is powdered cross-linked carboxymethyl cellulose. Cross-linked carboxymethyl cellulose (CLCMC) is available, for example, from the Aqualon Company in fibrous form (AQUASORB F) or as a fine powder. If obtained in fibrous form, it is preferable that the fibers be ground into particulates. Preferably, the powder is ground into particulates having a range of sizes with a median size of between about 20 and about 50 micrometers. For example, powders with a size range mainly between about 10 and about 100 micrometers with a median size of about 40 micrometers may be suitable.

The fibrous CLCMC may be air jet milled to achieve this degree of fineness, and several passes through the mill may be required. After milling, it may be desirable to sieve the powder to remove any fibers that have not been reduced to a powder. These fibers may include unreacted cotton, the raw material for making the CLCMC. A yield of about 50 weight percent of powdered CLCMC from the starting fibrous material is typical.

To swell the particles for use according to the present invention, the powder is preferably added to the carrier fluid, mixed and heated at an elevated temperature until the powder is fully swollen. For example, the mixture may be heated up to about 60° C. without chemically converting the CLCMC. The time needed to substantially completely swell the CLCMC particles is typically about 14 days for the carrier fluid used in the sealant example that is discussed hereinbelow.

The advantages conferred upon the sealant by the utilization of enlarged, extremely soft particulates are numerous. One advantage results from the fact that a highly conformable particle can effectively close a pore that is much smaller than the particle, in contrast to firm or rigid particles that can only merely pack into pores typically still leaving substantial gaps among the packed particles. This means that, for a given volume of particulate matter, very soft particles need not be as finely divided as more rigid particles. Because a more finely mixed substance generally results in increased viscosity in a mix, the use of very soft particulates aids substantially in achieving a sealant with low viscosity without sacrificing the capability of the sealant to form low porosity plugs.

The highly swollen particles will also provide a less porous plug when the particles are sufficiently soft. If the particles are sufficiently soft, they will conform around the fibers clogged in the plug and squeeze tightly into any initial pores when they are carried there by the escaping carrier fluid. The pressure gradient across the plug is sufficient to deform the particles so that the plug has much less final porosity than can be achieved by using particles that are not as soft.

Additionally, particles that are greatly swollen by the carrier fluid will not settle or centrifuge excessively since they have nearly the same density as the carrier fluid. It is important that the solids in the sealant be resistant to settling due to the high centrifugal forces encountered when the wheeled vehicle is moving rapidly. This is particularly true for sealants having a relatively low viscosity.

Alternatively, if a viscous, non-dissolving, non-drying fluid such as a non-oxidizing oil is disbursed into stable droplets in the carrier fluid, the droplets will behave in much the same way as the aforementioned highly swollen particles. Droplets caught or forced into the plug only have to be substantially more viscous than the carrier fluid to be effective in reducing the bleeding of the plug.

For example, the droplet may have a viscosity greater than about 10 times the viscosity of the carrier fluid. Compounds useful for forming such droplets include emulsified oils, such as silicon oil. In one embodiment, the droplets increase in rigidity after being disposed in the pores, such that the droplets change from being sufficiently soft to being relatively rigid. This can occur, for example, by polymerization of the droplets.

In addition to the highly swollen particles, it is preferable to add extremely fine particles to the composition. These fine particles aid in blocking the smallest pores in the sealant plug. An example of fine particles useful for this purpose are silica aerogel powders. These powders are extremely fine, and preferably have a surface area between about 90 m$^2$/g and 150 m$^2$/g.

According to another aspect of the present invention, fibers and non-colloidal particulates of varying density can be utilized to achieve an average particulate density close to the carrier fluid effective density (i.e., the density of the carrier fluid including the extremely fine particles). If there is a sufficient total percentage of fibers to form a mass that interlocks and is tight enough to catch at least most of any particulates moving through the fibrous mass, the composite mass will settle or centrifuge essentially as though each fiber and particulate were made of material with the average density of the composite. A precise match to the effective carrier fluid density is not necessary, and it will be sufficient to be within about 10%, as the fibers will ordinarily have enough "springiness" to prevent harmful compaction if there is not a large density difference. In typical commerical sealants, the solid matter is substantially suspended by the relatively high viscosity of the sealant. In more mobile sealants, as per the present invention, the viscosity is not sufficient for this purpose and density matching is important.

In one embodiment according to the present invention, cellulose fibers are used which have an estimated density of about 1.40 grams/cubic centimeter (g/cc) after absorbing carrier fluid to their capacity. Additionally, polyethylene fibers are utilized which have a density of about 0.96 g/cc and absorb very little carrier fluid. Roughly equal masses of each fiber are utilized yielding an average density of about 1.18 g/cc, which is slightly higher than the effective density of about 1.15 g/cc for the carrier fluid.

In another embodiment that has corresponding densities, all of the fibers and/or particles have substantially the same density. This same density corresponds to the density of the carrier fluid. Regardless of the embodiment, the function or aspect to be achieved is that the sealing fibers and/or particles remain substantially suspended in the carrier fluid and do not settle therefrom. Then with a hole or other aperture occuring in the tubeless tire or tube, the solid matter of the mobile sealant is able to be carried to the hole for plugging the same.

According to another aspect of the present invention, a novel carrier fluid for use in a sealant composition is provided. The present inventors have conducted a series of tests to determine the longevity and usefulness of various mobile sealants, including sealants that are commercially available. It has been found by the present inventors that substantial amounts of carrier fluid in presently available sealants are lost even without any punctures occurring in the tube. For small tires in particular, the loss of even small amounts of carrier fluid can cause thickening of the sealant and render the sealant much less mobile.

With proper formulation of the solids in a sealant, fluid gains of even 25 percent will not seriously weaken the ability of the sealant to plug and seal holes. Because mobility is so important to the mobile type sealant, fluid loss if generally more deleterious than equal fluid gain. The sealant formulations disclosed herein will work very well within a range of minus 15 percent to plus 25 percent fluid change.

By combining the three aspects of the present invention, a most preferred sealant composition is obtained. The sealant has a low viscosity and is mobile enough to seal punctures anywhere in the tube. The sealant bleeds very little and excessive loss of carrier fluid due to gaseous diffusion over time is avoided for a wide range of climate conditions.

EXAMPLE

One liter of carrier fluid composition comprising 800 ml of ethylene glycol and 200 ml of water is formed. To this, 50 grams of silica powder is added. The silica powder provides extremely small particles to aid in blocking the smallest pores in the sealant plug.

To this mixture, 0.1 gram of denatonium benzoate is added. The denatonium benzoate is a bittering agent that prevents the ingestion of the ethylene glycol containing sealant by animals or children, in case the sealant has escaped or has been removed from the tube.

To this mixture, 50 milliliters of concentrate containing 2 grams of cross-linked carboxymethyl cellulose powder is added. The concentrate is prepared by adding 20 grams of powdered carboxymethyl cellulose to a liter of the carrier fluid composition. The mixture is heated at 60° C. for about 14 days until the carboxymethyl cellulose is substantially fully swollen.

Thereafter, 6 grams of polyethylene pulp having a fiber length distribution mainly between 0.5 millimeter and 3 millimeter is added. These fibers have a specific gravity of about 0.96 and are used to counterbalance the denser cellulose fibers and ground cellulose fibers.

Four grams of ground cellulose fibers having a length distribution mainly between 0.2 millimeter and 0.6 millimeter are then added. This proportion of the cellulose fiber is used in a short fiber form to provide bulk without unduly increasing the viscosity of the sealant.

Thereafter, 2 grams of cellulose pulp with a high percentage of fibers in the 3 millimeter to 12 millimeter length range are added.

The mix is added to blend for a few minutes before adding the longer fibers and after the addition of the longer fibers is mixed for about ½ hour to insure a good dispersion of the cellulose fibers.

The narrow-tube and wide-tube versions of these sealants may be made by modifying the amounts of the long and short cellulose fibers.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A composition for sealing a tubeless tire or tube, comprising:
   a carrier fluid including means for substantially reducing diffusion of at least portions of said carrier fluid through the tubeless tire or tube;
   fibers; and
   particle means being sufficiently deformable wherein said particle means conform around said fibers when subjected to a pressure gradient due to a hole in the tubeless tire or tube and in which said particle means occupy spaces among said fibers so that a combination of said fibers and said particle means acts to substantially seal the hole and said particle means is made of a material that is substantially non-dissolvable by said carrier means.

2. A composition, as claimed in claim 1, wherein:
   said carrier fluid comprises greater than about 60% by volume of ethylene glycol.

3. A composition, as claimed in claim 1, wherein:
   the average density of said fibers and said particle means substantially corresponds to the density of said carrier fluid.

4. A composition, as claimed in claim 1, wherein:
   said particle means increases at least twice in size after being combined with said carrier fluid.

5. A composition as claimed in claim 1, wherein said means for reducing diffusion comprises a glycol.

6. A composition for sealing a tubeless tire or tube, comprising:
   particle means for closing pores, said particle means being sufficiently soft to be conformable by a pressure gradient due to a hole in the tubeless tire or tube and said particle means is made of a material that is substantially non-dissolvable by said carrier means; and
   a carrier fluid wherein said carrier fluid provides mobility to said particles means sufficient to transport at least a portion of said particle means to the hole.

7. A composition, as claimed in claim 6, wherein:
   said particle means increase in size when combined with said carrier fluid.

8. A composition, as claimed in claim 6, wherein:
   said particle means is made of a material having a density substantially corresponding to the density of said carrier fluid.

9. A composition, as claimed in claim 6, wherein:
   said particle means at least double in size when mixed with said carrier fluid.

10. A composition, as claimed in claim 9, wherein:
    substantial amounts of said particle means increase in size about 5 or greater times after mixing with said carrier fluid.

11. A composition, as claimed in claim 6, wherein:
    said particle means are not so soft as to substantially disintegrate.

12. A composition, as claimed in claim 6, wherein:
    said particle means includes finely divided cross-linked carboxymethyl cellulose.

13. A composition, as claimed in claim 12, wherein:
    said particle means includes about 1 gram of said finely-divided cross-linked carboxymethyl cellulose with each liter of said carrier fluid.

14. A composition, as claimed in claim 6, wherein:
    said particle means includes about 1 gram of finely-divided carboxymethyl cellulose mixed with each liter of said carrier fluid having about 80% ethylene glycol by volume.

15. A composition as claimed in claim 6, wherein:
said composition further includes fibers interacting with said particle means for closing holes in the tubeless tire or tube.

16. A composition, as claimed in claim 15, wherein:
said fibers includes a first group of fibers and a second group of fibers having a density different from said first group of fibers.

17. A composition, as claimed in claim 16, wherein:
a substantial amount of said second group of fibers has a different length than said first group of fibers.

18. A composition, as claimed in claim 17, wherein:
said composition includes a third group of fibers that has a substantial amount thereof with a length greater than any of the lengths of said first and second groups of fibers.

19. A composition, as claimed in claim 18, wherein:
said first group of fibers includes polyethylene pulp fibers, said second group of fibers includes cellulose fibers and said third group of fibers include cellulose pulp fibers.

20. A composition, as claimed in claim 6, wherein:
said particle means is made of a material that does not settle relative to said carrier fluid.

21. A composition, as claimed in claim 6, wherein:
said particle means includes fiber means having substantially the same density as said carrier fluid.

22. A composition for sealing a tubeless tire or tube, comprising:
carrier means being fluidic for providing mobility; and
sealant means for closing holes that occur in the tubeless tire or tube, said sealant means having substantially the same density as the density of said carrier means.

23. A composition, as claimed in claim 22, wherein:
said sealant means includes particle means in which all of said particle means has substantially the same density as said carrier means.

24. A composition, as claimed in claim 22, wherein:
said sealant means includes first sealing means and second sealing means and the density of each of said first sealing means and said second sealing means is combined to provide an average density substantially corresponding to the density of said carrier means.

25. A composition, as claimed in claim 24, wherein:
said sealant means includes substantially small particles and any difference between the density of the combination of said particles and said carrier means and the average density that includes said first and second sealing means is no greater than about 10% of one of said two densities.

26. A composition, as claimed in claim 24, wherein:
said second sealing means includes a first group of fibers and a second group of fibers in which a substantial amount of said first group of fibers has a fiber length different from the fiber length of said second group of fibers.

27. A composition, as claimed in claim 24, wherein:
said first sealing means includes polyethylene pulp fibers.

28. A composition, as claimed in claim 27, wherein:
said polyethylene pulp fibers have a density of about 0.96 grams/cc.

29. A composition, as claimed in claim 24, wherein:
said second sealing means includes cellulose fibers.

30. A composition, as claimed in claim 29, wherein:
said cellulose fibers have a density of about 1.40 grams/cc after said cellulose fibers have absorbed their capacity of said carrier means.

31. A composition, as claimed in claim 24, wherein:
said first sealing means includes a substantial number of fibers having a first length and said second sealing means includes a substantial number of fibers having a second length and in which said first length is different from said second length.

32. A composition, as claimed in claim 22, wherein:
said sealant means includes second means that is one of: (1) particle means that increases in size and (2) droplet means having a substantially greater viscosity than the viscosity of said carrier mean, said sealant means also includes fiber means and said fiber means and said second means act together to plug holes in the tubeless tire or tube.

33. A composition, as claimed in claim 32, wherein:
said second means is sufficiently soft to be deformed for positioning among said fiber means whereby the combination of said second means and said fiber means acts to plug holes in the tubeless tire or tube.

34. A composition, as claimed in claim 24, wherein:
said first sealing means includes polyethylene pulp fibers having a length of about 0.5-3 mm.

35. A composition, as claimed in claim 24, wherein:
the amount of said polyethylene pulp fibers is about 6 grams per liter of said carrier means.

36. A composition, as claimed in claim 24, wherein:
said second sealing means includes cellulose fibers having a length of about 0.2-6 mm.

37. A composition, as claimed in claim 36, wherein:
said cellulose fibers is about 4 grams per liter of said carrier means.

38. A composition, as claimed in claim 24, wherein:
said second sealing means includes cellulose pulp fibers having a length of about 3-12 mm.

39. A composition, as claimed in claim 38, wherein:
said cellulose pulp fibers is about 2 grams per liter of said carrier means.

40. A composition, as claimed in claim 24, wherein:
said average density that includes said first and second sealing means is about 1.18 grams/cc and the average density of said carrier means is about 1.15 grams/cc.

41. A composition for sealing a tubeless tire or tube, comprising:
a carrier fluid; and
sealant means combined with said carrier fluid and including means for closing pores comprising emulsified oil.

42. A composition as recited in claim 41, wherein said means for closing pores comprises silicon oil.

43. A composition as recited in claim 41, wherein said oil has a viscosity greater than about 10 times the viscosity of said carrier fluid.

44. A composition as recited in claim 41, wherein said carrier fluid comprises at least about 60 percent of a glycol to reduce diffusion of said carrier fluid.

45. A composition for sealing a tubeless tire or tube, comprising:
(a) a carrier fluid including a glycol for reducing diffusion of said carrier fluid;
(b) particles of cross-linked carboxymethyl cellulose, said particle means is made of a material that is substantially non-dissolvable by said carrier means; and (c) fibers.

46. A composition as recited in claim 45, wherein the average density of said particles and said fibers is within about 10 percent of the density of said carrier fluid.

47. A composition as recited in claim 46, wherein said fibers comprise polyethylene pulp fibers.

48. A composition as recited in claim 45, further comprising fine particles having a surface area of from about 90 $m^2/g$ to about 150 $m^2/g$.

* * * * *